US008608368B2

(12) United States Patent
Bresciani et al.

(10) Patent No.: US 8,608,368 B2
(45) Date of Patent: Dec. 17, 2013

(54) METHOD AND SYSTEM FOR CONTROLLING LOADING OF FOOD PRODUCTS IN A FOOD MIXING UNIT

(75) Inventors: Matteo Bresciani, Felonica (IT); Alberto Barbi, Poggio Rusco (IT)

(73) Assignee: Dinamica Generale S.p.A., Poggio Rusco (IT)

( * ) Notice: Subject to any disclaimer, the term of this patent is extended or adjusted under 35 U.S.C. 154(b) by 797 days.

(21) Appl. No.: 12/825,314

(22) Filed: Jun. 28, 2010

(65) Prior Publication Data

US 2011/0320033 A1 Dec. 29, 2011

(51) Int. Cl.
*B01F 15/02* (2006.01)

(52) U.S. Cl.
USPC .......................... 366/141; 119/51.01; 701/50

(58) Field of Classification Search
USPC ......... 366/302, 306, 307, 314, 318–324, 603, 366/141; 241/101.76, 101.761, 101.8, 241/260.1, 605; 700/213; 701/50; 119/51.01, 51.02

See application file for complete search history.

(56) References Cited

U.S. PATENT DOCUMENTS

| | | | | |
|---|---|---|---|---|
| 5,424,957 | A * | 6/1995 | Kerkhoff et al. | 700/240 |
| 6,032,084 | A * | 2/2000 | Anderson et al. | 700/241 |
| 6,216,053 | B1 * | 4/2001 | Cureton et al. | 700/104 |
| 6,516,270 | B2 * | 2/2003 | Pavlak et al. | 701/471 |
| 8,146,624 | B2 * | 4/2012 | Ghiraldi | 141/83 |
| 2002/0007798 | A1 * | 1/2002 | Pavlak et al. | 119/51.01 |
| 2002/0116200 | A1 * | 8/2002 | Cureton et al. | 705/1 |
| 2009/0020076 | A1 * | 1/2009 | Ghiraldi | 119/57.92 |
| 2011/0261641 | A1 * | 10/2011 | Barbi | 366/141 |
| 2011/0320033 | A1 * | 12/2011 | Bresciani et al. | 700/213 |
| 2012/0287745 | A1 * | 11/2012 | Ghiraldi | 366/152.1 |
| 2012/0312240 | A1 * | 12/2012 | Bachman et al. | 119/51.01 |
| 2012/0312241 | A1 * | 12/2012 | Bachman et al. | 119/51.02 |
| 2013/0092087 | A1 * | 4/2013 | Bachman et al. | 119/51.01 |

FOREIGN PATENT DOCUMENTS

| | | | |
|---|---|---|---|
| EP | 2011390 | A1 * | 1/2009 |
| EP | 2204088 | A1 * | 7/2010 |
| WO | 2007040388 | | 4/2007 |
| WO | 2008097080 | | 8/2008 |
| WO | 2008118005 | | 10/2008 |

OTHER PUBLICATIONS

Search Report based on Italian Application No. ITBO20080787, Ministero dello Sviluppo Economico, Nov. 16, 2009, pp. 2.

* cited by examiner

*Primary Examiner* — Charles E Cooley
(74) *Attorney, Agent, or Firm* — Bryan A. Santarelli; Graybeal Jackson LLP

(57) ABSTRACT

An embodiment of a system for controlling loading of food products in a food mixing unit by using a loader unit, the system having: a weighing device, which is mounted on the mixing unit and has a memory for storing at least one recipe of food products to be loaded and, for each food product of the recipe, first geographic coordinates associated with the food product and identifying a stocking area of the food product; a GPS receiver associated to the loader unit to detect second geographic coordinates identifying the place in which the loader unit is located; and a processing unit configured to check the weight of the food products of the recipe as these are gradually loaded in the mixing unit, to acquire the second geographic coordinates for each food product being loaded when the loader unit takes the food product from a stocking area and to compare the second geographic coordinates with the first geographic coordinates for each food product being loaded in order to verify that the correct food product is being taken.

17 Claims, 1 Drawing Sheet

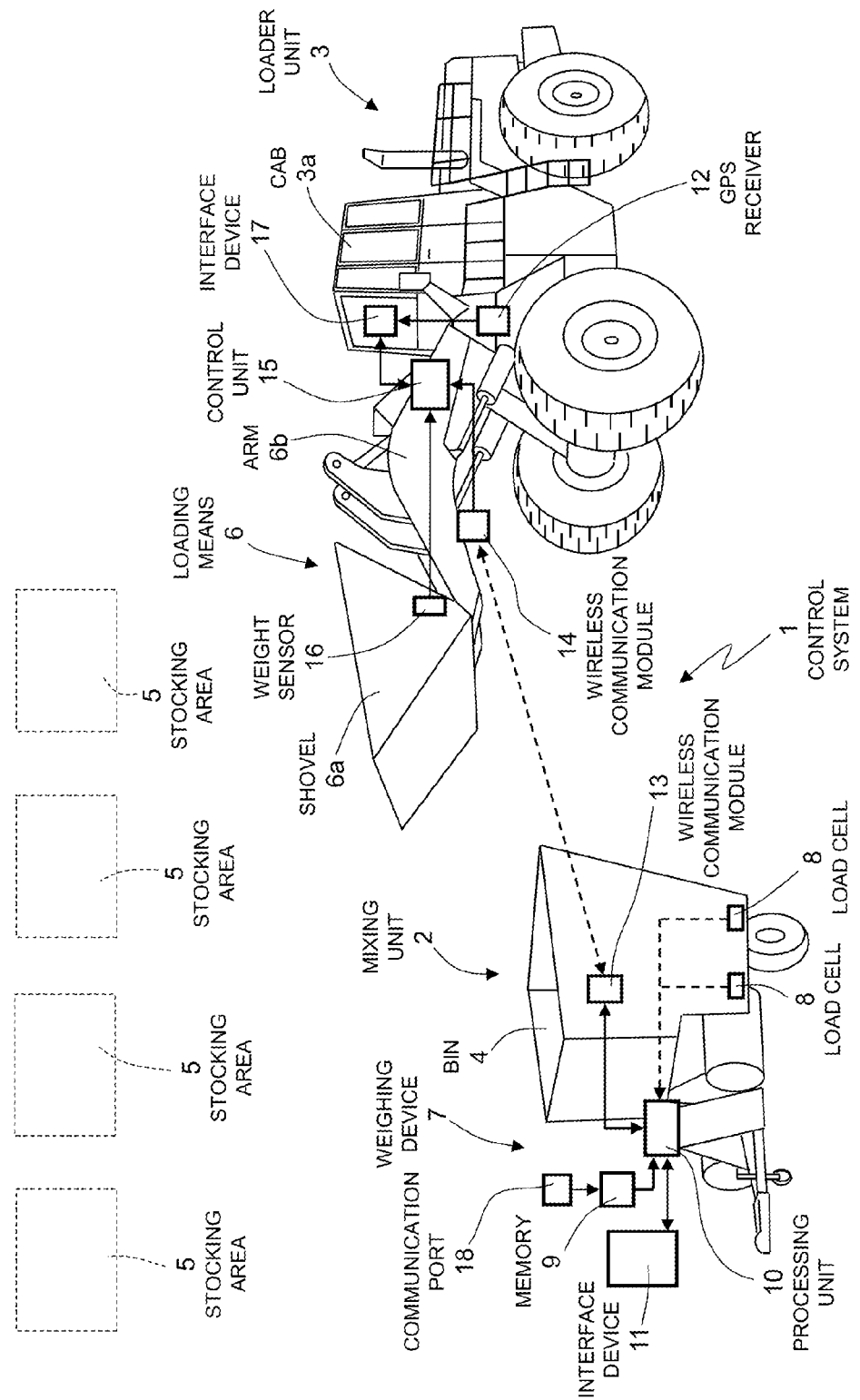

METHOD AND SYSTEM FOR CONTROLLING LOADING OF FOOD PRODUCTS IN A FOOD MIXING UNIT

TECHNICAL FIELD

An embodiment of the present invention relates to a method for controlling the loading of food products in a food mixing unit and to corresponding control system.

In particular, an embodiment of the present invention may be adopted advantageously but not exclusively in the zootechnical sector to check that food products loaded in a food mixing unit by means of at least one loader unit are effectively the food products programmed in a pre-established food recipe, to which the description below will explicitly refer without prejudice to its generality.

BACKGROUND

It is known that many livestock enterprises and stock-farms prepare the ration of food to be administered to each animal using a mixing unit consisting of a mixing wagon comprising a bin in which several food products are loaded by means of an external loader unit comprising, for example, an engine-driven vehicle with mechanical shovel. The mixer wagon also comprises one or more augers arranged inside the bin to mix the food products in the bin. The food products are loaded in the bin of the mixer wagon in a specific order according to the weights established by a recipe prepared previously by a nutritionist. Typically, each animal has different nutritional requirements according to breed, stage of growth and general conditions. Furthermore, the animals are divided into groups characterised by similar nutritional requirements. Therefore, each stock-farm has to prepare several food product recipes.

A prior art mixer wagon is equipped with a weighing device comprising load cells coupled with the bin in order to detect the weight of the contents of the bin, and a control unit connected to the load cells in order to check loading of the food products. The control unit comprises a memory in which one or more recipes are saved, a keyboard for entry of data and commands by an operator dedicated to the mixer wagon, for example to select the recipe, a processing unit to run a load programme defined by the recipe selected, a display to show information during execution of the recipe, for example to display the current weight recorded by the load cells and a buzzer to indicate that the pre-established weight of each food product has been reached.

In use, the load program scans the food products to be loaded in a certain order established by the selected recipe and emits an operator alarm when the pre-established weight of each food product is reached so that the operator may order the loader unit to load the next food product. The alarm is emitted, for example, in the form of an acoustic signal by means of a buzzer and/or in the form of a visual signal by means of the display. The loader unit takes each food product to be loaded from at least one relative stocking area.

Using the aforementioned control unit, the operator of the mixer wagon controls the quantity of each food product loaded. However, the operator of the mixer wagon does not have the possibility of automatically and accurately checking that each food product loaded by the loader unit in the mixer wagon is that effectively established by the recipe. In other words, the operator personally verifies that the stocking area from which the loader unit takes the food product is the correct area for the food product programmed.

SUMMARY

An embodiment of the present invention include a method and system for controlling loading of food products in a food mixing unit that eliminates the above-mentioned drawbacks and is also easy and economical to produce.

BRIEF DESCRIPTION OF THE DRAWINGS

To facilitate understanding of the present disclosure, an embodiment is now described, for the purpose of providing a non-limiting example, with reference to the single FIGURE (FIG. 1) attached, which provides as schematic view of the system for controlling loading of food products in at least one food mixing unit by means of at least one loader unit, such system being implemented according to an embodiment of the present invention.

DETAILED DESCRIPTION

In the sole FIG. 1 indicates, in its entirety, an embodiment of the system implemented according to this invention, 2 indicates the mixing unit, which is preferably but not necessarily mobile, and 3 indicates the loader unit.

In the example of the attached FIGURE, the mixing unit 2 comprises a towable type mixer wagon comprising a bin 4 to receive the food products to be mixed and an auger (not shown) to mix the food products in the bin 4. Each of the food products to be loaded in the mixing unit 2 is usually stacked in at least one relative stocking area 5. The loader unit 3 is mobile in order to move to one stocking area 5 at a time and to transport a quantity of the relative food product to the mixing unit 2. The loader unit 3 comprises loading means 6 able to take a quantity of a food product from the respective stocking area 5 and to load the food product taken in the bin 4 of the mixing unit 2. In the example of the attached FIGURE, the loader unit 3 is of the self-propelled type, i.e., it consists of an engine-driven vehicle, and in particular of a tractor, equipped with a cab 3a for an operator, and the loading means 6 comprise a bucket or mechanical shovel 6a mounted in a mobile manner on the tractor by means of an articulated arm 6b.

Referring again to the attached FIGURE, the system 1 comprises a weighing device 7 mounted on the mixing unit 2 for checking the weight of the food products loaded in the bin 4. The weighing device 7 comprises one or more load cells 8 coupled to the bin 4 in order to detect the weight of the food products in the bin 4, and a memory 9 in which to save at least one recipe of food products to be loaded in the bin 4. Each recipe comprises a list of food products and a pre-established weight for each food product. The weighing device 7 also comprises a processing unit 10 for execution of a load program defined by a selected recipe, an interface device 11 equipped with relative keyboard, display and buzzer for interaction between the operator of the mixing unit 2 and the weighing device 7, so that the operator is able to enter commands, for example, to select the recipe to be followed, and receive information from the weighing device 7 during execution of the recipe, for example to display the weight of each food product detected by the load cells 8 and to emit acoustic signals when the pre-established weight of each food product is reached.

According to an embodiment of the present invention, the system 1 comprises at least a GPS receiver 12 mounted on the loader unit 3 to detect the geographic coordinates of the place where the loader unit 3 is located, a first wireless type communication module 13 which is incorporated in the weighing device 7 and is connected to the processing unit 10, and at least one second wireless type communication module 14 which is mounted on the loader unit 3, and is connected, by means of a control unit 15, to the GPS receiver 12 and is able to communicate with the first communication module 13 to allow the processing unit 10 to acquire the geographic coordinates detected by the receiver 12 at the moment in which the loader unit 3 takes a food product from a relative stocking area 5. The communication modules 13 and 14 are of the type able to communicate via radio waves or infrared rays.

The system 1 also comprises a weight sensor 16, which is coupled to the mechanical shovel 6a and is connected to the control unit 15 in order to detect the presence of a food product in the loading means 6, and a further interface device 17, which is mounted in the cab 3a of the loader unit 3, is connected to the control unit 15 and is provided with relative keyboard, display and buzzer so that the operator of the loader unit 3 may enter commands and receive signals relating to loading of a food product, for example to display the weight detected by the weight sensor 16.

Lastly, the weighing device 7 is fitted with a communication port 18 connected to the memory 9 to permit saving of the recipe and of further relative information in the memory 9. The communication port 18 consists, for example, of a reader for so-called memory cards, or of a short-range wireless communication port, or a USB port. The structure of the system 1 described above permits implementation of the method for controlling loading of food products in a mixing unit 2 of an embodiment of the present invention, such method being described below.

For the sake of simplicity but without any loss of generality, in the case considered below the memory 9 of the weighing device 7 saves a single recipe and each food product of the recipe may be taken from a single stocking area 5.

First of all, according to an embodiment, each stocking area 5 is identified by means of a respective set of points in space, each defined by the relative geographic coordinates, referred to hereinafter as GC1. In particular, the set of points comprises at least three points to define a determined polygon in space that encloses at least part of the relative stocking area 5. The set of points that identifies the relative stocking area 5 is associated to each food product of the recipe. The recipe is then saved in a generic database held on a central computer, not shown, saving for each food product of the recipe the weight of the food product and the geographic coordinates GC1 of the set of points associated to such food product.

The recipe and the geographic coordinates GC1 associated with the food products of the recipe are saved in the memory 9 of the weighing device 7 of the mixing unit 2 by means of the communication port 18 of the weighing device connected to the memory 9. The system 1 is now ready for use.

In use, the operator of the mixing unit 2 selects a recipe by means of the interface device 11 which replies by displaying the first food product being loaded. Hereinafter, the wording "food product being loaded" means the food product that, according to the list of food products of the recipe, must be loaded at a certain time in the mixing unit 2. In the case in which several loader units 3 are present, for example if there is a type of loader unit 3 for each type of food product of the recipe, or the loader units 3 are distributed amongst the various stocking areas 5 if these are at a considerable distance from each other, the operator of the mixing unit 12 selects one of the available loader units 3. Possibly, information regarding the food product being loaded, such information comprising an identification code of the food product, the weight of the food product and the geographic coordinates GC1 associated to the food product, is transmitted by the weighing device 7 to the loader unit 3 selected by means of communication modules 13 and 14. Such information is displayed by the interface device 17 in order to notify this to the operator who is on the loader unit 3 selected.

At this point, the operator of the selected loader unit 3 drives such loader unit 3 to the stocking area 5 relative to the food product being loaded in order to take the programmed quantity of such food product.

An embodiment of the method comprises a step of acquiring, by the weighing device 7, the geographic coordinates, indicated in the following description by GC2, that identify the place in which the loader unit 3 is located when it takes the food product from the stocking area 5. This step is based on use of the GPS receiver 12 mounted on the loader unit 3. In particular, the step of acquisition of the geographic coordinates GC2 comprises the following steps:

detecting, by means of the weight sensor 16, the presence of the food product on the loading means 6, i.e., presence of the food product in the shovel 6a;

querying the GPS receiver 12 in order to obtain the geographic coordinates GC2 when the food product is present on the loading means 6; and transmitting immediately the geographic coordinates GC2 to the weighing device 7 by means of the communication modules 13 and 14.

The step of acquisition of the geographic coordinates GC2 is followed by a step of comparison, by the weighing device 7, of the geographic coordinates GC2 with the geographic coordinates GC1 associated to the food product being loaded, to check whether the loader unit 3 is taking the correct food product, i.e., that the loader unit 3 is taking the food product from the correct stocking area 5. In particular, the step of comparison consists in checking whether the point identified by the geographic coordinates GC2 is located inside the polygon defined by the set of points associated with the food product being loaded.

If the result of the check on the geographic coordinates is positive, the loader unit 3 may return to the mixing unit 2 in order to load the food product just taken in the bin 4. After checking that the weight of the food product loaded in the bin 4 is correct, the weighing device 7 moves to the second food product of the recipe which becomes the new food product being loaded and the steps described above are repeated.

If the result of the check on the geographic coordinates is negative, i.e., if the point identified by the geographic coordinates GC2 is outside the polygon, the interface device 11 is activated to emit an acoustic and/or visual error signal in order to inform the operator of the mixing unit 2 that an incorrect food product is being taken and the load program of the recipe may possibly be interrupted. The negative result of the comparison is also transmitted, by means of the communication modules 13 and 14, to the loader unit 3 that has taken the incorrect food product so that the relative interface device 17 may be activated to emit a similar error signal to also notify the operator of the loader unit 3 that an incorrect food product is being taken.

The above steps relating to acquisition of the geographic coordinates GC2 and comparison of the geographic coordinates GC2 with the geographic coordinates GC1 are implemented by the system 1 by suitably configuring the control unit 15 so that it queries the GPS receiver 12 when the weight sensor 16 detects the presence of the food product in order to obtain the geographic coordinates GC2 and orders the communication module 14 to transmit the geographic coordinates GC2, and suitably configuring the processing unit 10 so that it acquires, by means of the communication module 13, the geographic coordinates GC2 transmitted by the communication module 14 of the loader unit 3 that has taken the food product, compares the geographic coordinates GC2 acquired with the geographic coordinates GC1 associated to the food product being loaded and activates the interface device 11 so that the relative display and/or buzzer issues the above-mentioned error signal in the case in which the result of the comparison is negative. Furthermore, the processing unit 10 is configured to activate the communication module 13 so as to communicate the negative result of the comparison to the loader unit 3 that has taken the food product, and the control unit 15 is configured to receive, by means of the communication module 14, the negative result of the comparison transmitted by the weighing device 7 and therefore to command the interface device 17 in such a way that the relative display and/or buzzer emits the above-mentioned error signal.

Therefore, the method of control and the system 1 described above permit substantially automatic checking that the food products loaded in the mixing unit 2 effectively correspond to those established by the recipe selected.

According to a second embodiment of this invention, not illustrated, the system 1 is without the weight sensor 16 and the method for controlling loading differs from the preferred embodiment described above in that acquisition of the geographic coordinates CG2 comprises the following steps:

waiting for the operator of the loader unit 3 to enter a confirmation command by means of the interface device 17; and querying the GPS receiver 12 following entry of such confirmation command in order to obtain the geographic coordinates GC2.

The confirmation command may be entered by the operator after visually checking that the loading means 6 are ready to take the food product from the stocking area 5. For this reason, functioning of the system 1 according to such embodiment is substantially semiautomatic.

The differences between the method according to such embodiment and the method according to the embodiment described previously are also reflected in a different configuration of the control unit 15. In particular, the control unit 15 is configured to query the GPS receiver 12 after the interface device 17 has acquired the confirmation command.

A third embodiment, not illustrated, of the present invention is now described and applies to the case in which the mixing unit 2 is self-propelled in order to move to the various stocking areas 5 in the order defined by the list of food products of the recipe, and comprises a generic loader unit 3 for directly taking the food product from the stocking area 5 reached. For example, the loader unit 3 is of the type comprising at least a conveyor and/or at least an auger mounted on the mixing unit 2 to take the food product from the stocking area 5 reached. According to such embodiment, the system 1 is without the communication modules 13 and 14, the control unit 15 and weight sensor 16. The GPS receiver 12 is connected to the processing unit 10 and may be incorporated in the weighing device 7, even though, alternatively, it may be mounted on the loader unit 3. In both the above arrangements, the GPS receiver 12 is associated with the loader unit 3. The method for controlling loading differs from the first embodiment described above in that acquisition of the geographic coordinates CG2 comprises the following steps:

waiting for the operator of the mixing unit 2 to enter a confirmation command by means of the interface device 11; and querying the GPS receiver 12 following entry of such confirmation command in order to obtain the geographic coordinates GC2.

The confirmation command may be entered by the operator after visually checking that the loading means 6 of the loader unit 3 are ready to take the food product from the stocking area 5. The processing unit 10 is configured to query the GPS receiver 12 after the interface device 11 has acquired the confirmation command.

An advantage of the method and of the system 1 described above is that of permitting control of loading of the food products in the mixing unit 2 by means of at least one loader unit 3 that permits automatic or semiautomatic checking that each food product loaded is that effectively programmed by the recipe saved in the weighing device 7 of the mixing unit 2, without the operator of the mixing unit 2 having to check personally that the stocking area 5 from which the loader unit 3 takes the food product is the correct area.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. Method for controlling loading of food products in a food mixing unit, which loading occurs by means of at least one loader unit; the mixing unit comprising a weighing device, which comprises storage means to store at least one recipe comprising a list of food products to be loaded in the mixing unit and is suitable to check the weight of the food products of the recipe as they are loaded in the mixing unit; the loader unit being suitable to take each food product from at least one relative stocking area; the method being characterised in that it comprises the steps of:

identifying each stocking area by means of a respective set of points in space, each of them defined by the relative geographic coordinates;

associating to each food product of the recipe at least the set of points identifying said at least one relative stocking area;

storing in said storage means, for each food product of the recipe, the first geographic coordinates of the set of points associated to said food product;

acquiring, by the weighing device, for each food product of the recipe being loaded, second geographic coordinates identifying the place where the loader unit is located when it takes the food product from a stocking area, by means of at least one GPS receiver associated to the loader unit; and comparing, by the weighing device, the second geographic coordinates with the first geographic coordinates associated to the food product being loaded in order to check whether the correct food product is being taken.

2. Method according to claim 1, wherein the set of points associated to each said food product of the recipe comprises at least three points; said step of comparing the second geographic coordinates with the first geographic coordinates associated to the food product being loaded comprising the step of checking whether the point defined by the second geographic coordinates is inside a polygon defined by the set of points associated to the food product being loaded.

3. Method according to claim 1, wherein the loader unit is self-propelled in order to reach said stocking area and to carry the relative food product from the stocking area to the mixing unit; said GPS receiver being mounted on the loader unit.

4. Method according to claim 3, wherein said loader unit comprises loading means to take a food product from said relative stocking area and to load the taken food product into said mixing unit; said step of acquiring, by the weighing device, for each food product of the recipe being loaded, second geographic coordinates identifying the place where the loader unit is located, comprising the steps of:

- detecting, by weight detecting means connected to said loading means, the presence of the food product on the loading means;
- if the food product is present on the loading means, querying said GPS receiver to obtain the second geographic coordinates; and
- transmitting the second geographic coordinates from the loader unit to the weighing device by communication means mounted on the loader unit and on the weighing device.

5. Method according to claim 3, wherein said step of acquiring, by the weighing device, for each food product of the recipe being loaded, second geographic coordinates identifying the place where the loader unit is located, comprises the steps of:

- waiting for an operator of said loader unit to enter a first command by means of first man-machine interface means mounted on the loader unit;
- querying said GPS receiver following entry of the first command in order to obtain the second geographic coordinates; and
- transmitting the second geographic coordinates from the loader unit to the weighing device by communication means mounted on the loader unit and the weighing device.

6. Method according to claim 1, wherein said mixing unit is self-propelled in order to reach said stocking area and comprises said loader unit to retrieve the food product directly from the stocking area.

7. Method according to claim 6, wherein said weighing device comprises second man-machine interface means; said step of acquiring, by the weighing device, for each food product of the recipe being loaded, second geographic coordinates identifying the place where the loader unit is located, comprising the steps of:

- waiting for an operator of said mixing unit to enter a second command by means of the second man-machine interface means;
- querying said GPS receiver following entry of the second command in order to obtain the second geographic coordinates.

8. Method according to claim 1, comprising the step of emitting at least one visual or acoustic error signal if the comparison between said second geographic coordinates and said first geographic coordinates associated to the food product being loaded reveals that an wrong food product is being taken.

9. System for controlling loading of food products in a food mixing unit, which loading occurs by means of at least one loader unit; the system comprising a weighing device, which is mounted on the mixing unit, comprises storage means to store at least one recipe comprising a list of food products to be loaded in the mixing unit and comprises processing means configured to check the weight of the food products as they are loaded in the mixing unit; the loader unit being suitable to take each food product of the recipe from at least one relative stocking area; the system being characterised in that said storage means are suitable to store, for each food product of the recipe, first geographic coordinates relative to a set of points which is associated to the food product and identifies the stocking area relative to the food product; in that it comprises at least one GPS receiver associated to the loader unit to detect second geographic coordinates identifying the place where the loader unit is located; and in that said processing means are configured to acquire the second geographic coordinates for each food product being loaded when the loader unit takes the food product from a stocking area and to compare the second coordinates acquired for the food product being loaded with the first geographic coordinates associated to the food product being loaded in order to check whether the correct food product is being taken.

10. System according to claim 9, wherein the set of points associated to each food product of said recipe comprises at least three points; said processing means being configured to check whether the point defined by said second geographic coordinates is inside a polygon defined by the set of points associated to the food product being loaded.

11. System according to claim 9, wherein said loader unit is self-propelled in order to reach said stocking area and to carry the relative food product from the stocking area to the mixing unit; said GPS receiver being mounted on the loader unit.

12. System according to claim 11, wherein said loader unit comprises loading means to take a food product from said relative stocking area and to load the taken food product in said mixing unit; the system comprising: weight detecting means connected to said loading means to detect the presence of a food product on the loading means; control means which are mounted on the loader unit, are connected to the weight detecting means and to said GPS receiver and are configured to query the GPS receiver in case the food product is present on the loading means in order to obtain said second coordinates; and communication means mounted on the loader unit and on said weighing device to transmit the second geographic coordinates from the loader unit to the weighing device.

13. System according to claim 12, wherein said communication means comprise a first wireless communication module, which is incorporated in said weighing device and is connected to said processing means and, at least one second wireless communication module, which is mounted on said at least one loader unit, is suitable to communicate with the first wireless communication module and is connected to said GPS receiver.

14. System according to claim 11, comprising: first man-machine interface means mounted on said loader unit to allow an operator of the loader unit to enter a first command; control means, which are mounted on the loader unit, are connected to the first man-machine interface means and to said GPS receiver and are configured to query the GPS receiver following entry of the first command in order to obtain said second coordinates; and communication means mounted on the loader unit and on said weighing device to transmit the second geographic coordinates from the loader unit to the weighing device.

15. System according to claim 9, wherein said mixing unit is self-propelled in order to reach said stocking area and comprises said loader unit to directly take the food product from the stocking area.

16. System according to claim 15, wherein said weighing device comprises second man-machine interface means which are connected to said processing means and allow an operator of said mixing unit to enter a second command; said processing means being connected to said GPS receiver and being configured to query the GPS receiver following entry of the second command in order to obtain said second coordinates.

17. System according to claim 9, wherein said weighing device comprises second man-machine interface means, which are connected to said processing means and are suitable to emit visual and/or acoustic signals; the processing means being configured to control the second man-machine interface means so that they emit at least one visual or acoustic error signal in the case in which the comparison between said second geographic coordinates and said first geographic coordinates associated to the food product being loaded reveals that a wrong food product is being taken.

\* \* \* \* \*